Aug. 31, 1965 A. VOGT 3,203,189
DEVICE FOR MAINTAINING A CONSTANT TEMPERATURE
OR DENSITY IN A LIQUID
Filed Dec. 26, 1963 2 Sheets-Sheet 1

INVENTOR.
ALFRED VOGT
BY
Frank R. Dufoui
AGENT

United States Patent Office 3,203,189
Patented Aug. 31, 1965

3,203,189
DEVICE FOR MAINTAINING A CONSTANT TEMPERATURE OR DENSITY IN A LIQUID
Alfred Vogt, Aachen-Forst, Germany, assignor to North American Philips Company, Inc., New York, N.Y., a corporation of Delaware
Filed Dec. 26, 1963, Ser. No. 333,480
Claims priority, application Germany, Jan. 31, 1963, P 31,045
12 Claims. (Cl. 62—3)

The invenion relates to a device for maintaining a constant temperature or density in a liquid.

It is known to maintain water at its freezing temperature by throwing pieces of ice into the water and continuously stirring the liquid containing the pieces of ice. Thus, the amount of heat extracted from the water is such that it is cooled to zero degrees centigrade and remains at its freezing temperature as long as it contains ice. This adjustment of the freezing point is used in devices wherein accurate temperature measurements are to be performed with the aid of thermoelectric elements which require a constant reference temperature. However, the establishment of a reference temperature with the aid of water containing ice is laborious, since the ice melts and new ice must continually be supplied, so that the vessel containing the liquid must be continuously supervised.

According to the invention, the disadvantages of the method described of establishing a constant reference temperature are avoided by the use of a device for maintaining a constant temperature or density in a liquid which is characterized by a thermoelectrically cooled contact member which at a given temperature or density of the liquid is immersed into the liquid to a predetermined depth. The contact member is so arranged that deviations from the given temperature or density cause it to be sunk further into the liquid or to be raised therefrom so that it withdraws greater or smaller amounts of thermal energy from the liquid. A Peltier refrigerating device cooling the contact member preferably serves as a counter-weight for the pivotably mounted contact member and for a metal heat dissipating member by which the heat produced at the hot end of the Peltier element is conducted away from the measuring region.

The device in accordance with the invention operates without any supervision, since the contact member continuously extracts from the liquid an amount of heat sufficient to maintain it in the liquid state. When the contact member is immersed in the liquid, a coating of ice is produced thereon which exerts an upward pressure. Consequently, the contact member rises slightly from the liquid so that the area of contact between the contact member and the liquid is reduced. The extraction of heat from the liquid is thereby decreased by an amount such that the liquid state is just maintained. If external influences should cause the temperature of the liquid to rise, the contact member is sunk deeper into the liquid with a resulting increase of the area of contact between the liquid and the member. Hence a greater amount of heat is withdrawn from the liquid and the freezing temperature is restored. Thus, the contact member oscillates into a steady state position.

In the same manner, the device in accordance with the invention is suited to maintain a constant density of a liquid. For this purpose, the contact member may be adjusted so as to be maintained at a predetermined immersion depth at a given temperature-dependent density of the liquid. If a decrease in temperature causes the density to increase, the contact member rises from the liquid similarly to a hydrometer and reduces the extraction of heat. If, on the contrary, the temperature of the liquid rises and the density of the liquid is consequently decreased, the contact member sinks deeper into the liquid and, since the area of contact is accordingly increased, it withdraws a greater amount of heat so that the liquid is cooled again. In this case also, the contact member oscillates to reach a steady immersion depth.

In a further embodiment of the invention, the thermal contact between the contact member and the cooled side of the Peltier element can be broken by upward movement of the contact member. To achieve continuous working of the contact, the contact member is in thermal contact with the cooled side of the Peltier element by way of a layer of mercury, the area of contact between the mercury layer and the contact member being reduced when the contact member is raised. This additionally enables the temperature of the contact member to be adjusted so that the heat extraction may be accurately regulated.

In order that the invention may readily be carried into effect, embodiments thereof will now be described, by way of example, with reference to the accompanying diagrammatic drawings, in which.

Figure 1:
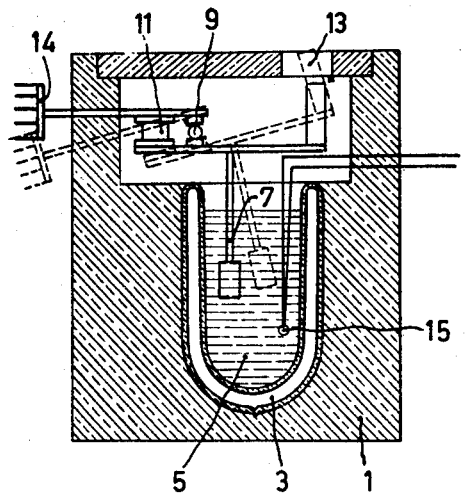
FIGURE 1 shows an embodiment of a device in accordance with the invention comprising a pivotally mounted contact member and a Peltier refrigerating device.

An insulating container 1 contains a Dewar flask 3. The Dewar flask 3 is filled with water 5. A contact member 7 pivotable about an axle 9 is partially immersed into the water. A Peltier refrigerating element 11, the cold side of which is connected to the contact member 7 and to a dissipating member 13, acts as a counterweight for the contact member 7. Cooling fins 14, which are brought out through an aperture in the insulating container, are connected to the hot side of the Peltier element.

When the contact member is deeply immersed into the liquid, it extracts heat from the liquid in an amount dependent upon the size of the area of contact. At the same time the contact member is coated with ice which exerts an upward pressure. Consequently, the contact member 7 is partly raised out of the liquid. As a result, the area of contact between the water and the contact member 7 is decreased so that less heat is withdrawn. The heat withdrawal is further reduced by the dissipating member 13. When the contact member 7 is raised, member 13 is lifted out of the insulating container, as indicated by the dashed lines in FIG. 1, and thereby supplies external heat to the contact member. After a certain period of time, the temperature of the water is adjusted to the constant freezing temperature so that the contact member assumes, for example, the position shown by the broken lines. Since the liquid is continuously at the freezing temperature, a thermoelectric element 15 disposed in the liquid is also at a constant temperature and hence may be used for reference measurements.

Figure 2:
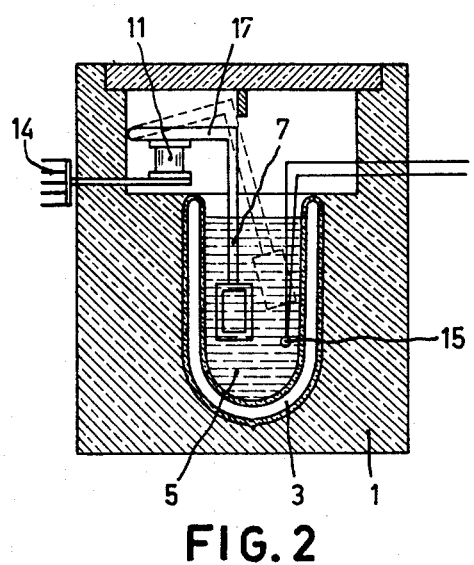
FIGURE 2 shows an embodiment which utilizes the cooperation of a pivotable contact member and a fixed Peltier refrigerating device.

In the device of FIGURE 1, the contact member 7 is in continuous contact with the cold side of the Peltier element 11. To obtain a still higher degree of accuracy of the regulation, the conduction of heat between the contact member 7 and the Peltier element 11 may be interrupted or reduced. To interrupt the heat conduction, the Peltier element is arranged to be stationary, as shown in FIGURE 2. When the device is switched on, an arm 17 of the contact member engages the cold side of the Peltier element 11. Thus the contact member 7 is completely in thermal contact with the Peltier element. If ice is produced on the contact member, however, and the member partly rises out of the liquid, the arm 17 is lifted from the cold side of the Peltier element 11 so that the thermal contact is broken. As a result, the ice on the contact member melts and the contact member again sinks deeper into the liquid until the arm 17 re-establishes the thermal contact with the Peltier element.

Figure 3:
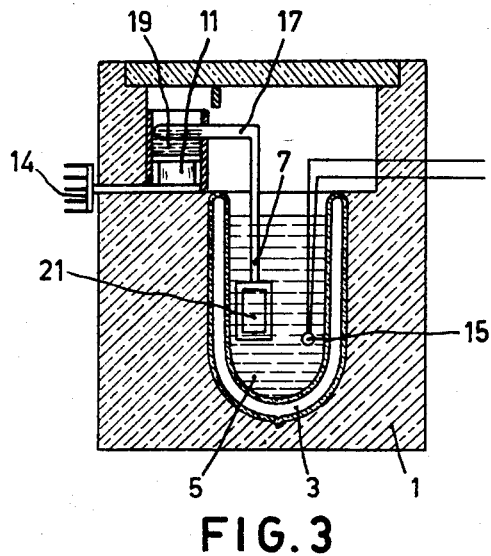
FIGURES 3 and 4 show an embodiment for the continuous reduction of the area of contact between the refrigerating device and the contact member.
Figure 4:
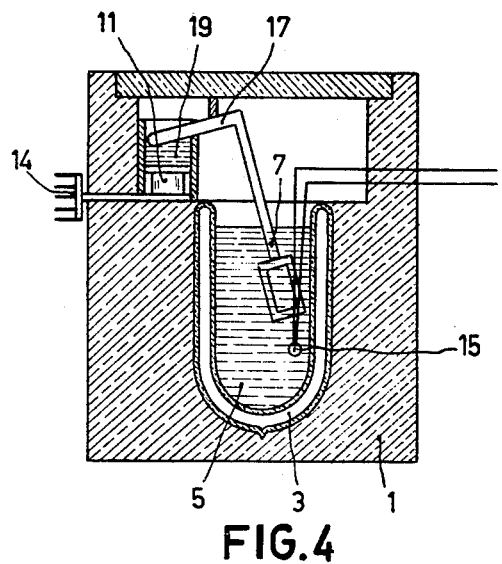

This method of regulation, however, suffers from the disadvantage that the contact member 7 is continuously raised and lowered and slight fluctuations of the temperature in the liquid are inevitable. This may be avoided by providing a layer of mercury 19 which initially covers the cold side of the Peltier element 11, as shown in FIG. 3. Initially, before the device is switched on, the arm 17 of the contact member 7 completely engages the mercury layer 19. In this arrangement, if ice is deposited on the contact member 7 so that this member rises, the thermal contact between the Peltier element 11 and the arm 17 is not immediately broken. The area of contact between the arm 17 and the mercury layer 19 is only gradually reduced when the contact member 7 is raised. In this arrangement, the contact member need not continually be raised and lowered. On the contrary, after a certain period of time it will oscillate into a steady position, in which the amount of heat extracted from the liquid is sufficient to maintain the liquid continuously at the freezing temperature.

To maintain a predetermined temperature-dependent density of the liquid, the device in accordance with the invention is built in the same manner as shown in FIGURES 1–4. If required, the contact member 7 is provided with a chamber 21 filled with the said liquid or a gas, which enables the contact member 7 to be immersed to a predetermined depth into the liquid at a predetermined density thereof.

What is claimed is:

1. Apparatus for controlling the temperature or density of a liquid, comprising a container which holds said liquid, heat transfer means immersed in said liquid to a given level and having a given surface area in thermal contact therewith at a predetermined value of temperature or density of said liquid, thermoelectric heat absorbing means in thermal contact with said heat transfer means, and means for movably mounting said heat transfer means in said liquid, said heat transfer means being responsive to a change in temperature or density of said liquid from said predetermined values for varying its level of immersion thereby varying the surface area of said heat transfer means which contacts said liquid so that the amount of thermal energy extracted from said liquid is varied.

2. Apparatus for maintaining a liquid at a predetermined temperature comprising a container which holds said liquid, heat transfer means immersed in said liquid to a given level at said predetermined temperature and having a given surface area in thermal contact therewith, thermoelectric heat absorbing means in thermal contact with said heat transfer means, and means for movably mounting said heat transfer means in said liquid so that the level of immersion of said heat transfer means can be varied, said heat transfer means being responsive to a change in temperature of said liquid from said predetermined temperature for varying its level of immersion in said liquid whereby said area of thermal contact is changed so as to vary the amount of thermal energy extracted from said liquid to maintain said predetermined temperature.

3. A temperature control device for maintaing a constant reference temperature comprising a container, a liquid housed in said container having a change of state temperature equal to said reference temperature, heat transfer means immersed in said liquid to a given level at said reference temperature and having a given surface area in thermal contact therewith, thermoelectric heat absorbing means in thermal contact with said heat transfer means, and means for pivotally mounting said heat transfer means about a point external to said liquid so that the level of immersion of said heat transfer means can be varied, said heat transfer means being responsive to a change in temperature of said liquid from said reference temperature for varying its level of immersion in said liquid whereby said area of thermal contact is changed so as to vary the amount of thermal energy extracted from said liquid sufficient to maintain said reference temperature.

4. Apparatus as described in claim 3 wherein said heat transfer means comprises a contact member having a first arm portion extending into said liquid and a second arm portion, said contact member being pivotally mounted about said pivotal mounting means so that said first and second arm portions tend to counter balance one another, and said heat absorbing means comprises a Peltier cooling element having its cold junction in thermal contact with said second arm portion and having its hot junction in thermal coupling relationship with the ambient atmosphere.

5. Apparatus as described in claim 3 wherein said Peltier element is mounted on said second arm portion to act as a counterweight for said first arm portion, and wherein said contact member further comprises a metal arm extending from said first arm portion and movable therewith, said metal arm being in variable thermal coupling relationship with the ambient atmosphere at least through a portion of its range of travel.

6. A temperature control device for maintaining a constant reference temperature comprising a container, a liquid housed in said container having a change of state temperature equal to said reference temperature, thermoelectric heat transfer means comprising a contact member and a Peltier cooling element mounted adjacent to said contact member, said contact member being pivotally mounted about a point external to said liquid and immersed in said liquid to a given level at said reference temperature and having a given surface area in thermal contact therewith, said contact member being pivotable into a first position in thermal contact with said Peltier element and into a second position in which said thermal contact is broken, and said contact member being responsive to a change in temperature of said liquid from said reference temperature for varying its level of immersion in said liquid whereby said area of thermal contact is changed so as to vary the amount of thermal energy extracted from said liquid sufficient to maintain said reference temperature.

7. A temperature control device for maintaining a constant reference temperature comprising a container, a liquid housed in said container having a change of state temperature equal to said reference temperature, thermoelectric heat transfer means comprising a contact member and a thermoelectric cooling element, a housing containing a liquid bath having good thermal conductivity, said contact member comprising a first arm portion extending into said container liquid to a given immersion level at said reference temperature and having a given surface area in thermal contact therewith and a second arm portion extending into said housing bath and having a given surface area in thermal contact with the liquid therein, means for mounting said thermoelectric element in heat transfer relation with said liquid bath in said housing, and means for pivotally mounting said contact member about a point so that the area of thermal contact between said first arm portion and said container liquid and between said second arm portion and said housing liquid can be continuously varied, said contact member being responsive to a change in temperature of said container liquid from said reference temperature for varying its level of immersion whereby each of said areas of thermal contact are changed so as to vary the amount of thermal energy extracted from said container liquid.

8. Apparatus as described in claim 7 wherein said thermoelectric cooling element comprises a Peltier element having a cold junction in thermal contact with said housing liquid and a hot junction in heat transfer relation with the surrounding atmosphere, said contact member being pivotally mounted so that the area of thermal contact between said first arm portion and said container liquid and between said second arm portion and said housing liquid are simultaneously varied in the same direction.

9. Apparatus as described in claim 7 wherein said housing liquid is mercury and said container liquid is water maintained at its freezing temperature.

10. Apparatus as described in claim 7 wherein said first arm portion comprises a hollow sealed chamber containing a liquid or a gas having a given density related in a predetermined manner to the density of said container liquid whereby said first arm portion is immersed into said liquid to a given level for a predetermined density of said liquid.

11. Apparatus for maintaining a liquid at a constant given density, the density of said liquid being dependent upon its temperature, said apparatus comprising a container which holds said liquid, heat transfer means immersed in said liquid to a given level at said predetermined temperature and having a given surface area in thermal contact therewith, thermoelectric heat absorbing means in thermal contact with said heat transfer means, and means for movably mounting said heat transfer means in said liquid so that the level of immersion of said heat transfer means can be varied as the density of said liquid varies, said heat transfer means being responsive to a change in temperature of said liquid from said predetermined temperature for varying its level of immersion in said liquid whereby said area of thermal contact is changed so as to vary the amount of thermal energy extracted from said liquid to maintain said given density.

12. Apparatus for controlling the temperature of a liquid, comprising a container which holds said liquid, thermoelectric heat transfer means comprising a contact member, a thermoelectric cooling element and a housing containing a liquid bath having good thermal conductivity, said contact member comprising a first arm portion immersed in said container liquid to a given level and having a given surface area in thermal contact therewith at a predetermined temperature of said container liquid and a second arm portion extending into said housing bath and having a given surface area in thermal contact therewith at said given immersion level, means for mounting said thermoelectric element in heat transfer relation with the liquid bath in said housing, and means for movably mounting said contact member so that the area of thermal contact between said first arm portion and said container liquid and between said second arm portion and said housing liquid can be continuously varied, said contact member being responsive to a change in temperature of said container liquid from said predetermined temperature for varying its level of immersion whereby each of said areas of thermal contact are changed so as to vary the amount of thermal energy extracted from said container liquid.

References Cited by the Examiner

UNITED STATES PATENTS

| | | | |
|---|---|---|---|
| 1,804,072 | 5/31 | Turrettini | 63—3 |
| 2,952,724 | 9/60 | Fritts | 62—3 |
| 2,986,890 | 6/61 | Bevans | 62—3 |
| 3,027,725 | 4/62 | Harvey | 62—3 |
| 3,091,940 | 6/63 | Feldman | 62—3 |

WILLIAM J. WYE, *Primary Examiner.*

ROBERT A. O'LEARY, *Examiner.*